US005320324A

United States Patent [19]

Norton

[11] Patent Number: 5,320,324

[45] Date of Patent: Jun. 14, 1994

[54] BRACKET FOR HOLDING A SUBASSEMBLY OF AN INBOARD/OUTBOARD MOTOR IN AN UPRIGHT POSITION

[76] Inventor: Timothy R. Norton, 8 Joyce Ct., Niantic, Conn. 06357

[21] Appl. No.: 792,193

[22] Filed: Nov. 13, 1991

[51] Int. Cl.[5] .............................. F16M 13/00

[52] U.S. Cl. .............................. 248/640; 248/214; 248/310

[58] Field of Search .............. 248/640, 674, 214, 300, 248/176, 310, 643; 211/13, 87, 89

[56] References Cited

U.S. PATENT DOCUMENTS

| | | | |
|---|---|---|---|
| 1,307,211 | 6/1919 | Newlon | 248/214 |
| 1,488,437 | 3/1924 | Rhoads | 248/214 |
| 2,266,683 | 12/1941 | Berglund | 248/640 |
| 2,273,815 | 2/1942 | Bevington | 248/643 X |
| 2,455,821 | 12/1948 | Stenger | 211/13 |
| 2,646,237 | 7/1953 | Hinesman | 248/640 |
| 2,966,319 | 12/1960 | Todish et al. | 248/640 |
| 4,461,385 | 7/1984 | Clouser | 211/87 X |
| 4,507,090 | 3/1985 | Kobayashi | 248/640 X |
| 4,893,771 | 1/1990 | Kaneshiro | 248/176 |

*Primary Examiner*—David A. Scherbel
*Assistant Examiner*—Derek J. Berger
*Attorney, Agent, or Firm*—Fishman, Dionne & Cantor

[57] ABSTRACT

A bracket for holding a subassembly (i.e., a gear housing or a stern drive) of an inboard/outboard motor in an upright position is presented. The subassembly is removed from a conventional inboard/outboard motor and secured in the bracket for shipping, storage, or repair. The bracket having upper and lower support means disposed thereon for supporting the upper and lower portions respectively of the subassembly.

15 Claims, 3 Drawing Sheets

BRACKET FOR HOLDING A SUBASSEMBLY OF AN INBOARD/OUTBOARD MOTOR IN AN UPRIGHT POSITION

BACKGROUND OF THE INVENTION

This invention relates to brackets for securing motors, and more particularly to brackets for securing conventional inboard/outboard motor subassemblies in an upright position.

Outboard motor stands for securing conventional outboard motors in an upright position are known. Generally, outboard motor stands of the type described in U.S. Pat. Nos. 2,249,270 (1939) and 2,266,683 (1941) provide means for securing outboard motors in an upright position. These are generally wooden stands having braces for supporting the upper and lower portions of the outboard motor. A strap or other means is employed about the middle portion of the motor to secure it to the stand. Access to the motor while on the stand is somewhat restricted by the large base board that the braces are mounted on. This, however does not pose a great problem with outboard motors since most parts are accessible from the exposed portions (i.e., sides, front and top).

The prior art has addressed this problem by employing a smaller base board for mounting the braces on, see Popular Science, August, 1948, p. 176. Again, this is a wooden stand which secures the middle portion of the outboard motor to the stand.

The upper portion of an outboard motor comprises the motor, which is generally the largest section of the outboard motor. The middle section comprises an enclosed shaft for delivering power from the motor to a propeller. The enclosed shaft and propeller housing are generally substantially smaller than the motor. The brace for supporting the upper portion (i.e., the motor) has been located just below the motor to support its weight. The lower brace is located so as to support the propeller housing.

This arrangement for securing outboard motors is not suitable for securing gear housing or stern drive subassemblies of conventional inboard/outboard motors. Generally, only the gear housing subassembly of an inboard/outboard motor is removed for repair while the motor remains in the boat. However, it may also be advantageous at times to remove the entire stern drive subassembly for repair or storage. Further, when repairing the inboard/outboard gear housing or stern drive subassembly, it is important to have access to it from all sides.

SUMMARY OF THE INVENTION

The above-discussed and other problems and deficiencies of the prior art are overcome or alleviated by the bracket of the present invention. In accordance with the present invention, a gear housing subassembly is removed from an inboard/outboard motor and then secured in an upright position in the bracket for repair, storage or shipping. The bracket has a vertical member and support means disposed thereon for securing the upper portion of the gear housing. A lower member depends downwardly and outwardly from the vertical member so as to follow the contour of the lower portion of the gear housing. Lower support means depending outwardly from the lower member provides support for the lower portion of the gear housing. Rails are affixed between the lower support means and the lower member to prohibit lateral movement of the lower portion of the gear housing. Further, the bracket includes a means for mounting the bracket on a rail.

The gear housing is secured in the bracket so that the propeller shaft is extended away from the bracket. The bracket is small enough to provide sufficient access to all major components of the gear housing for repair or maintenance. The support means is provided in multiple embodiments so that the bracket can be employed with several different size gear housings from various inboard/outboard motor manufacturers.

In accordance with an alternate embodiment of the present invention, a stern drive subassembly is removed from an inboard/outboard motor and then secured in an upright position in the bracket for repair, storage or shipping. The bracket has a vertical member and support means disposed thereon for securing the upper portion of the stern drive. Lower support means depending outwardly from the vertical member provides support for the lower portion of the stern drive. Further, the bracket includes a means for mounting the bracket on a rail.

The bracket is small enough to provide sufficient access to all major components of the stern drive for repair or maintenance. The support means is provided in multiple embodiments so that the bracket can be employed with several different size stern drives from various inboard/outboard motor manufacturers.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
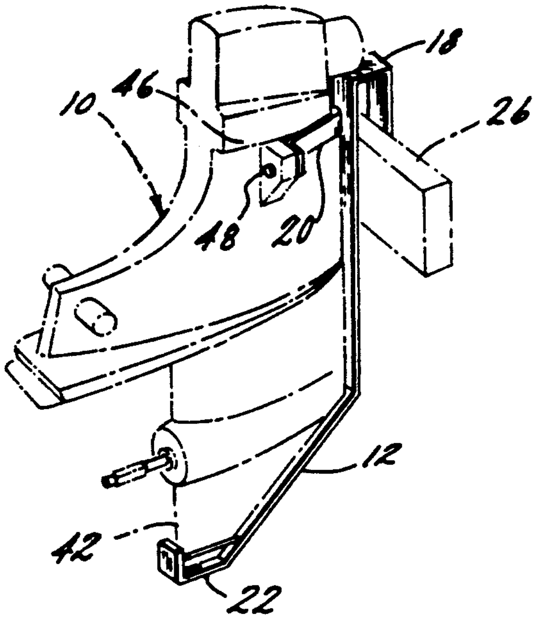
FIG. 1 is a perspective view of a gear housing subassembly of an inboard/outboard motor secured in a bracket in accordance with the present invention.
Figure 2:
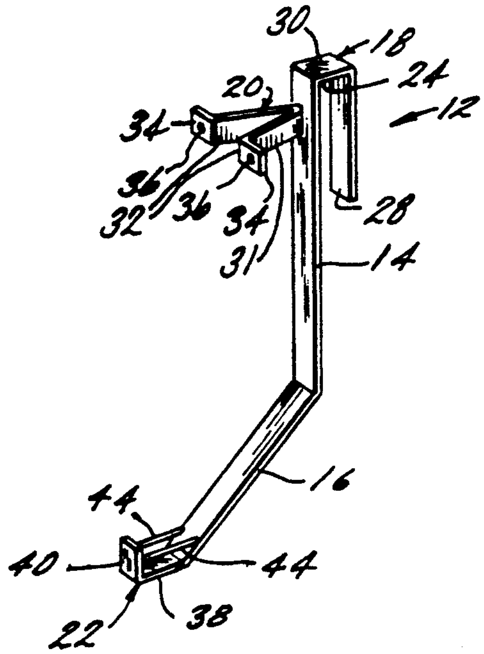
FIG. 2 is a perspective view of the bracket of FIG. 1.

Referring now to FIGS. 1 and 2 a gear housing subassembly 10 from a conventional inboard/outboard motor (e.g., a Mercruiser) is secured in a bracket 12. Bracket 12 comprises an upper vertical member 14, a lower member 16 depending downwardly and outwardly from the lower end of vertical member 14, mounting means 18 disposed on the upper end of vertical member 14, upper support means 20 disposed on vertical member 14 and lower support means 22 disposed on the lower end of lower member 16. Lower member 16 depends from vertical member 14 so as to generally follow the contour of housing 10.

As will be noted, the mounting means 18 comprises an inverted U-shaped portion 24 for mounting the bracket 12 on a rail 26. Portion 24 is comprised of the upper end of vertical member 14, a vertical section 28 and a horizontal section 30 therebetween.

The upper support means 20 is disposed on the upper portion of vertical member 14 and is comprised of a V-shape bracket 31 which is affixed (preferably welded) to vertical member 14 at the base of the V-shape. Legs 32 forming the V-shaped bracket 31 extend horizontally outward from vertical member 14 and terminate in ears 34 which are provided with apertures 36. Legs 32 extended so as to be receptive to a mounting area of gear housing 10. Apertures 36 provide means for mounting gear housing 10 to bracket 12.

The lower support means 22 comprises a base member 38 which extends horizontally outward from the lower end of lower member 16 and an upturned vertical leg 40 disposed at the outer end of base member 38. Base member 38 and upturned vertical leg 40 provide support for the lower portion 42 of housing 10. Vertical leg 40 prohibits portion 42 of housing 10 from sliding away from bracket 12. Support rails 44 are affixed (preferably welded) to each side of leg 40 and to each side of lower member 16. Support rails 44 prohibit lateral movement of portion 42 of housing 10.

Rail 26 may be affixed to a stand sufficient in size for supporting the weight of gear housing 10. Further rail 26 may be affixed to any surface sufficient in height to allow clearance of bracket 12 from the floor or ground and capable of supporting the weight of gear housing 10.

Inverted U-shaped portion 24, vertical member 14, lower member 16, base member 38 and vertical leg 40 are preferably a continuous piece of flat metal stock bent to form the above portions. However, each portion may be individually connected (e.g., welded) without departing from the spirit or scope of the present invention.

During use, portion 42 of gear housing 10 is disposed between support rails 44 and supported by base member 38 and vertical leg 40. The upper portion 46 of housing 10 is disposed between legs 32 of V-shaped bracket 31 to prohibit lateral movement of portion 46. Gear housing 10 may be mounted by a pair of nut and bolt assemblies 48 through apertures 36 to ears 34, thus prohibiting forward movement of housing 10. Housing 10 is now secured in bracket 12.

Figure 3:
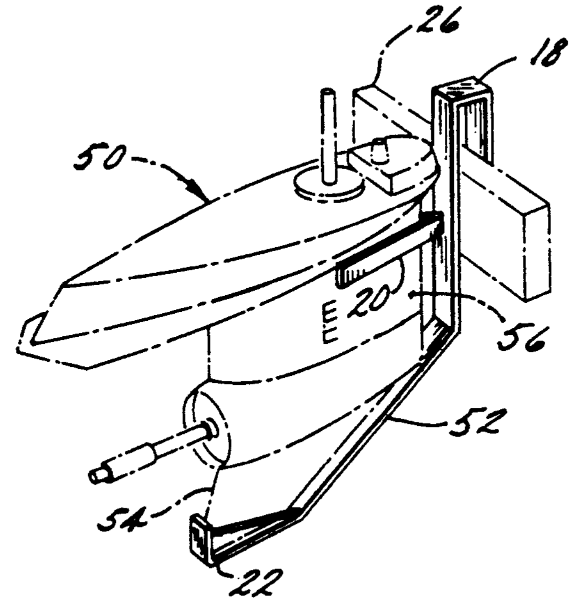
FIG. 3 is a perspective view of a gear housing subassembly of an inboard/outboard motor secured in a bracket in accordance with a second embodiment of the present invention.
Figure 4:
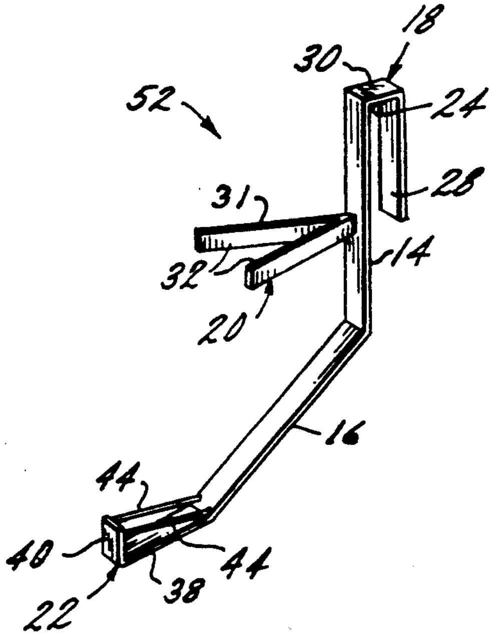
FIG. 4 is a perspective view of the bracket of FIG. 3.

Referring now to FIGS. 3 and 4 in a second embodiment of the present invention, wherein like elements to the first embodiment are numbered alike and reference should be made thereto for a description thereof, a gear housing subassembly 50 from a conventional inboard/outboard motor (e.g., a Johnson or Evinrude, model years 1982 and up) is secured in a bracket 52. Bracket 52 is essentially the same as bracket 12 (FIGS. 1 and 2) with the exception of the upper support means 20. Bracket 52 eliminates the ears 34 of bracket 12 (FIGS. 1 and 2).

During use, the lower portion 54 of gear housing 50 is disposed between support rails 44 and supported by base member 38 and vertical leg 40. The upper portion 56 of housing 50 is disposed between legs 32 of V-shaped bracket 31 to prohibit lateral movement of portion 56. Housing 50 is now secured in bracket 50.

Figure 5:
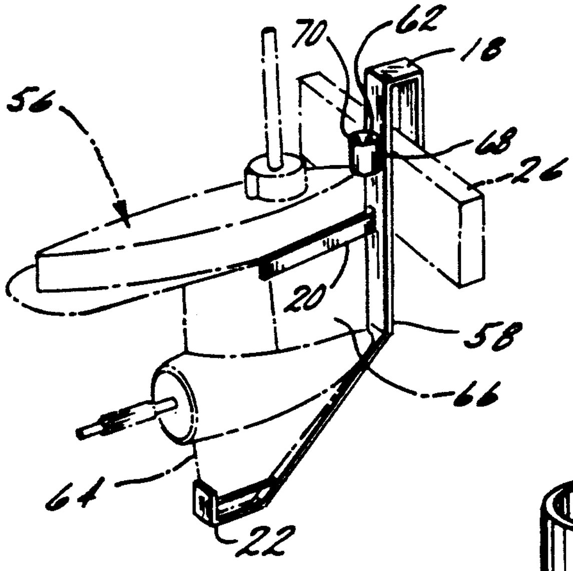
FIG. 5 is a perspective view of a gear housing subassembly of an inboard/outboard motor secured in a bracket in accordance with a third embodiment of the present invention.
Figure 6:
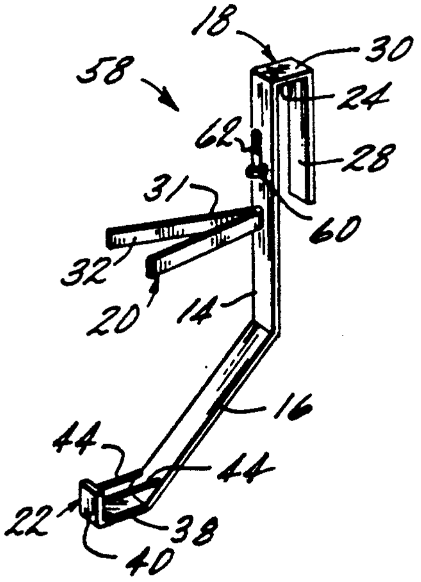
FIG. 6 is a perspective view of the bracket of FIG. 5.

Referring now to FIGS. 5 and 6 in a third embodiment of the invention, wherein like elements to the first and second embodiments are numbered alike and reference should be made thereto for a description thereof, a gear housing subassembly 56 from a conventional inboard/outboard motor (e.g., a Mercruiser) is secured in a bracket 58. Bracket 58 is essentially the same as bracket 12 (FIGS. 1 and 2) and bracket 52 (FIGS. 3 and 4) again with the exception of the upper support means 20. Bracket 58 also eliminates the ears 24 of bracket 12 (FIGS. 1 and 2). Further, bracket 58 includes a ledge 60 which is disposed on the upper portion of vertical member 14 at a predetermined distance above V-shape bracket 31. Ledge 60 is normally affixed (preferably welded) to vertical member 14. A pin 62 is normally affixed (also preferably welded) at about the center of ledge 60 to provide means for mounting gear housing 56 to bracket 58.

Figure 7:
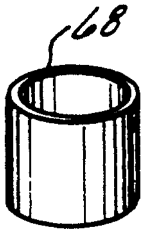
FIG. 7 is a perspective view of a collar used in conjunction with the bracket of FIG. 5.

During use, the lower portion 64 of gear housing 56 is disposed between support rails 44 and supported by base member 38 and vertical leg 40. The upper portion 66 of housing 56 is disposed between legs 32 of V-shaped bracket 31 to prohibit lateral movement of portion 66. Referring also to FIG. 7 a collar 68 prohibits forward movement of housing 56 when collar 68 is disposed over pin 62 and a stud 70 of gear housing assembly 56. Pin 62 may be threaded to provide other means of securing a gear housing. Housing 56 is now secured in bracket 58.

Figure 8:
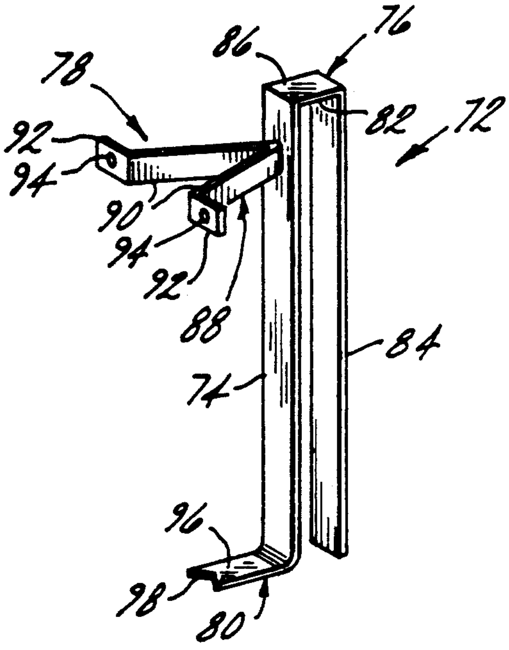
FIG. 8 is a perspective view of a bracket for holding a stern drive subassembly of an inboard/outboard motor in accordance with a fourth embodiment of the present invention.

Referring now to FIG. 8 in a fourth embodiment of the present invention, a bracket for securing a complete stern drive subassembly from a conventional inboard/outboard motor (e.g., Mercury Stern Drive from 1966 to date R and MR units) is shown generally at 72. Bracket 72 comprises vertical member 74, mounting means 76 disposed on the upper end of vertical member 74, upper support means 78 disposed on vertical member 74 and lower support means 80 disposed on the lower end of vertical member 74.

As will be noted, the mounting means 76 comprises an inverted U-shaped portion 82 for mounting the bracket 72 on a rail (not shown), the rail is the same as rail 26 described in the earlier embodiments. Portion 82 is comprised of the upper end of vertical member 74, a vertical section 84 and a horizontal section 86 therebetween.

The upper support means 78 is disposed on the upper portion of vertical member 74 and is comprised of a V-shaped bracket 88 which is affixed (preferably welded) to vertical member 74 at the base of the V-shape. Legs 90 forming the V-shaped bracket 88 extend horizontally outward from vertical member 74 and terminate in ears 92 which are provided with apertures 94. Legs 90 extended so as to be receptive to a mounting area of the stern drive (not shown). Apertures 94 provide means for mounting the stern drive to bracket 72.

The lower support means 80 comprises a base member 96 which extends horizontally outward from the lower end of vertical member 74 and terminates in a V-shape at 98. Base member 96 provides support for the lower portion of the stern drive.

Inverted U-shaped portion 82, vertical member 74 and base member 80 are preferably a continuous piece of flat metal stock bent to form the above portions. However, each portion may be individually connected (e.g., welded) without departing from the spirit or scope of the present invention.

During use, the lower portion of the stern drive is supported by base member 96 and the upper portion of the stern drive is disposed between legs 90 of V-shaped bracket 88 to prohibit lateral movement of the stern drive. The stern drive may be mounted by a pair of nut and bolt assemblies (not shown) through apertures 94 to ears 92, thus prohibiting forward movement of the stern drive. The stern drive is now secured in bracket 72.

Figure 9:
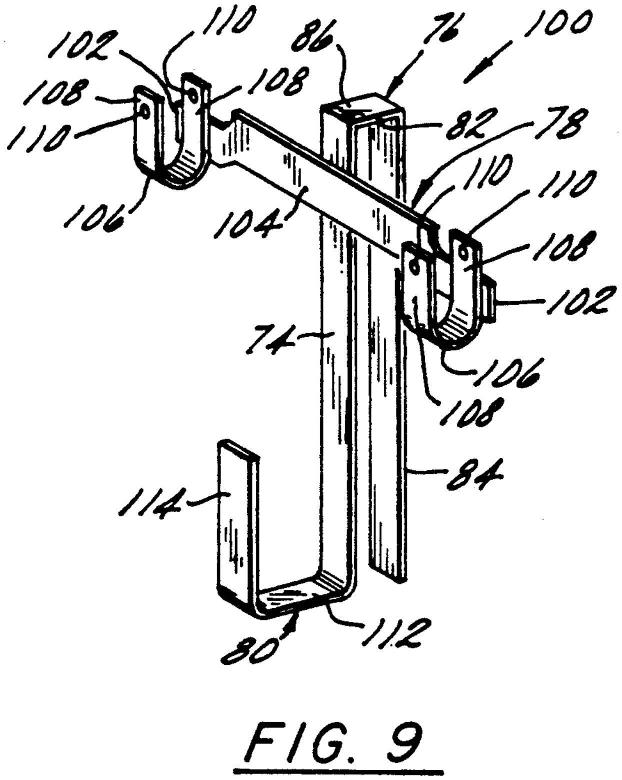
FIG. 9 is a perspective view of a bracket for holding a stern drive subassembly of an inboard/outboard motor in accordance with a fifth embodiment of the present invention.

Referring now to FIG. 9 in a fifth embodiment of the invention, wherein like elements to the fourth embodiment are numbered alike and reference should be made thereto for a description thereof, a bracket for securing a complete stern drive subassembly from a conventional inboard/outboard motor (e.g., Electric Shift 400 and 800, stern drive and upper case only) is shown generally at 100. Bracket 100 is essentially the same as bracket 72 (FIG. 8) with the exception of the upper support means 78 and the lower support means 80.

The upper support means 78 is disposed on the upper portion of vertical member 74 and is comprised of an elongated member 102 having offset end portions 104 which is affixed (preferably welded) to vertical member 74 at about the center of member 102. A U-shaped member 106 having legs 108 is attached (preferably welded), at one of its legs 108, to each end portion 104. Members 106 each have apertures 110 near the end of each leg 108. Legs 108 extended so as to be receptive to a mounting area of the stern drive (not shown). Members 106 with apertures 110 provide means for mounting the stern drive to bracket 100.

The lower support means 80 comprises a base member 112 which extends horizontally outward from the lower end of vertical member 74 and an upturned vertical leg 114 disposed at the outer end of base member 112. Base member 112 and upturned vertical leg 114 provide support for the lower portion of the stern drive.

During use, the lower portion of the stern drive is supported by base member 112 and vertical leg 114. An upper portion of the stern drive is disposed between legs 108 of member 106 to prohibit lateral and forward movement of the stern drive. The stern drive may be mounted by a pair of nut and bolt assemblies (not shown) through apertures 110 to members 106, thus securing the stern drive in members 106. The stern drive is now secured in bracket 100.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A bracket for holding a subassembly of an inboard/outboard motor, comprising:
   - a vertical member;
   - mounting means disposed at the upper end of said vertical member;
   - upper support means for supporting the upper portion of the subassembly, said upper support means having generally a V-shape including a pair of legs defining a vertex with the vertex disposed on said vertical member and the legs extending outwardly therefrom;
   - lower support means for supporting the lower portion of the subassembly, said lower support means disposed on the lower end of said vertical member; and
   - wherein said upper support means further comprises said legs terminating in ears at one end, each of said ears has an aperture therethrough, each of said apertures to be aligned with and connected to a corresponding mounting hole from the subassembly.

2. The apparatus of claim 1 wherein said mounting means comprises:
   - an inverted U-shaped member having two vertical sections and a horizontal section therebetween, one of said vertical sections disposed at the upper end of said vertical member.

3. The apparatus of claim 1 further comprises:
   - a lower member depending downwardly and outwardly from the lower end of said vertical member; and
   - wherein said lower support means is disposed on the lower end of said lower member.

4. The apparatus of claim 3 wherein said upper support means further comprises:
   - said legs terminating in ears at one end, each of said ears has an aperture therethrough, each of said apertures to be aligned with and connected to a corresponding mounting hole from the subassembly.

5. The apparatus of claim 3 wherein said lower support means comprises:
   - a base member extending horizontally outward from the lower end of said lower member; and
   - an upturned vertical leg disposed at one end of said base member.

6. The apparatus of claim 5 wherein said lower support means further includes:
   - a support rail affixed to said lower member and said upturned vertical leg at each opposing side thereof.

7. The apparatus of claim 3 wherein said mounting means comprises:
   - an inverted U-shaped member having two vertical sections and an inverted horizontal section therebetween, one of said vertical sections disposed at the upper end of said vertical member.

8. The apparatus of claim 3 wherein said upper support means extends horizontally outward from said vertical member.

9. A bracket for holding a subassembly of an inboard/outboard motor, comprising:
   - a vertical member;
   - mounting means disposed at the upper end of said vertical member;
   - upper support means for supporting the upper portion of the subassembly, said upper support means having generally a V-shape including a pair of legs defining a vertex with the vertex disposed on said vertical member and the legs extending outwardly therefrom;
   - lower support means for supporting the lower portion of the subassembly, said lower support means disposed on the lower end of said vertical member; and
   - wherein said mounting means comprises an inverted U-shaped member having two vertical sections and a horizontal section therebetween, one of said vertical sections disposed at the upper end of said vertical member.

10. The apparatus of claim 9 wherein said lower support means comprises:

a base member extending horizontally outward from the lower end of said lower member, said base member terminating in a V-shape.

11. The apparatus of claim 9 further comprising:

a lower member depending downwardly and outwardly from the lower end of said vertical member; and wherein said lower support means is disposed on the lower end of said lower member.

12. The apparatus of claim 11 further comprising:

a protruding surface being perpendicularly disposed above said upper support means on said vertical member;

a pin normally disposed on said protruding surface; and a collar disposed over said pin and a stud located on the upper portion of the subassembly.

13. The apparatus of claim 11 wherein said lower support means comprises:

a base member extending horizontally outward from the lower end of said lower member; and an upturned vertical leg disposed at one end of said base member.

14. The apparatus of claim 13 wherein said lower support means further includes:

a support rail affixed to said lower member and said upturned vertical leg at each opposing side thereof.

15. The apparatus of claim 11 wherein said upper support means extends horizontally outward from said vertical member.

* * * * *